United States Patent
Milton et al.

(10) Patent No.: US 10,938,914 B2
(45) Date of Patent: Mar. 2, 2021

(54) INTER DOMAIN INSTANT MESSAGING BRIDGE

(71) Applicant: Avaya Inc., Santa Clara, CA (US)

(72) Inventors: Stephen M. Milton, Freehold, NJ (US); Timothy I. Ross, Fair Haven, NJ (US)

(73) Assignee: Avaya Inc., Santa Clara, CA (US)

( * ) Notice: Subject to any disclaimer, the term of this patent is extended or adjusted under 35 U.S.C. 154(b) by 1070 days.

(21) Appl. No.: 14/997,855

(22) Filed: Jan. 18, 2016

(65) Prior Publication Data
US 2017/0208130 A1 Jul. 20, 2017

(51) Int. Cl.
| H04L 29/08 | (2006.01) |
| H04L 29/06 | (2006.01) |
| H04L 12/58 | (2006.01) |
| H04L 12/18 | (2006.01) |

(52) U.S. Cl.
CPC ........ *H04L 67/141* (2013.01); *H04L 12/1818* (2013.01); *H04L 51/04* (2013.01); *H04L 51/36* (2013.01); *H04L 65/1006* (2013.01); *H04L 65/1069* (2013.01); *H04L 65/1096* (2013.01); *H04L 67/02* (2013.01)

(58) Field of Classification Search
CPC ..... H04L 12/1818; H04L 51/04; H04L 51/36; H04L 65/1006; H04L 67/02; H04L 67/141; H04L 61/2564; H04L 61/2589
See application file for complete search history.

(56) References Cited

U.S. PATENT DOCUMENTS

| 7,319,692 | B2 | 1/2008 | Boyle et al. |
| 7,433,455 | B1 * | 10/2008 | Oran ................. H04M 3/38 379/201.01 |
| 7,543,034 | B2 * | 6/2009 | Deshpande .......... G06Q 10/107 709/206 |
| 7,756,979 | B1 * | 7/2010 | Staack ................ H04L 65/1006 709/204 |
| 8,730,946 | B2 * | 5/2014 | Mantripragada ... H04L 65/1079 370/352 |

(Continued)

OTHER PUBLICATIONS

Singh et al.,"Design and Implementation of SIP network and client services", Oct. 2004, IEEE Publishing.*

(Continued)

*Primary Examiner* — Todd L Barker
(74) *Attorney, Agent, or Firm* — Sheridan Ross P.C.

(57) ABSTRACT

A request to establish an IM session is received. For example, a Session Initiation Protocol (SIP) INVITE message is received. The request is to an Address of Record (AoR) that has two or more associated communication endpoints on different IM systems. The request is forked to the two or more communication endpoints. An IM communication server, acting on behalf of a first communication endpoint, receives one of the forked requests. The forked request is automatically answered. For example, the IM communication server can automatically send a SIP 200 OK message. The answer causes the second forked request to be automatically canceled. The IM communication server sends a second request to the second communication endpoint to add the second communication endpoint to the IM session. This allows each communication endpoints to display a single instance of an AoR on the IM session.

20 Claims, 3 Drawing Sheets

(56) References Cited

U.S. PATENT DOCUMENTS

| | | | | |
|---|---|---|---|---|
| 9,473,544 | B2* | 10/2016 | Ezell | H04L 65/4015 |
| 9,876,912 | B2* | 1/2018 | Brunson | H04L 65/1006 |
| 2006/0031292 | A1* | 2/2006 | Deshpande | H04L 51/04 |
| | | | | 709/204 |
| 2006/0116150 | A1* | 6/2006 | Bhutiani | H04L 65/4061 |
| | | | | 455/518 |
| 2007/0208807 | A1* | 9/2007 | Jagannathan | H04L 65/4061 |
| | | | | 709/204 |
| 2007/0225017 | A1* | 9/2007 | Li | H04W 4/023 |
| | | | | 455/456.1 |
| 2008/0102844 | A1* | 5/2008 | Zhu | H04L 45/00 |
| | | | | 455/445 |
| 2008/0248826 | A1* | 10/2008 | Holm | H04W 84/08 |
| | | | | 455/518 |
| 2008/0267095 | A1* | 10/2008 | Sekaran | H04L 12/1822 |
| | | | | 370/260 |
| 2008/0304471 | A1* | 12/2008 | Jackson | H04M 3/436 |
| | | | | 370/352 |
| 2009/0047915 | A1* | 2/2009 | Albertsson | H04W 4/10 |
| | | | | 455/90.2 |
| 2009/0049202 | A1* | 2/2009 | Pattison | H04M 15/00 |
| | | | | 709/249 |
| 2009/0089399 | A1* | 4/2009 | Beck | H04L 65/1069 |
| | | | | 709/218 |
| 2009/0193086 | A1* | 7/2009 | Lingafelt | H04L 51/04 |
| | | | | 709/206 |
| 2009/0238358 | A1* | 9/2009 | Ramanathan | H04M 3/42042 |
| | | | | 379/221.03 |
| 2011/0075653 | A1* | 3/2011 | Potts | H04L 65/1006 |
| | | | | 370/352 |
| 2012/0197964 | A1* | 8/2012 | Riordan | H04L 65/80 |
| | | | | 709/202 |
| 2013/0301822 | A1* | 11/2013 | Brunson | H04L 65/1096 |
| | | | | 379/213.01 |
| 2014/0086396 | A1* | 3/2014 | Ezell | H04L 65/1053 |
| | | | | 379/93.01 |
| 2014/0280595 | A1* | 9/2014 | Mani | H04L 12/1827 |
| | | | | 709/204 |
| 2014/0359457 | A1 | 12/2014 | Bellan et al. | |
| 2015/0006744 | A1* | 1/2015 | Chatterjee | H04L 65/1073 |
| | | | | 709/228 |
| 2015/0201024 | A1* | 7/2015 | Balasaygun | H04L 65/1069 |
| | | | | 709/203 |
| 2015/0302181 | A1* | 10/2015 | Fahn | G06F 16/40 |
| | | | | 726/26 |
| 2016/0314438 | A1* | 10/2016 | Berndtsson | G06Q 10/1095 |
| 2017/0032042 | A1* | 2/2017 | Rykowski | G06F 16/256 |

OTHER PUBLICATIONS

Dzieweczynski, "Implementation of Caller Preferences in Session Initiation Protcol (SIP)", Master thesis, Mar. 9, 2004, Information Networks Division at Linkoping Institute of Technology.*

Rosenberg et al. "RFC 3261: Session iniitiation Protocol", 269 pages total, Jun. 2002.*

Sparks et al., "RFC 3515: The Session initiation Protocol (SIP) Refer Method", 21 pages total, Apr. 2003.*

"NextPlane Joins Forces with BroadSoft to Enhance Unified Communications Collaboration Capabilities to BroadSoft's Customers," 2014, retrieved from http://nextplane.net/2014/06/10/nextplane-joins-forces-broadsoft-enhance-unified-communications-collaboration-capabilities-broadsofts-customers/, 4 pages.

"Partitioned Intradomain Federation for IM and Presence Service on Cisco Unified Communications Manager, Release 10.5(1)," 2014, retrieved from http://www.cisco.com/c/en/us/td/docs/voice_ip_comm/cucm/im_presence/intradomain_federation/10_5_1/CUP0_BK_I19EE4EF_00_integration-guide-intradomain-federation-105.pdf, 154 pages.

* cited by examiner

INTER DOMAIN INSTANT MESSAGING BRIDGE

TECHNICAL FIELD

The systems and methods disclosed herein relate to Instant Messaging (IM) systems and in particular to bridging of multiple IM systems.

BACKGROUND

Today, there are a variety of systems that provide IM services. In some cases, a company may use IM systems that are from different vendors. Simple IM services typically work well between IM systems from different vendors. However, with the advent of a single Address of Record (AoR) that may be used with multiple devices, integration between systems from different vendors has become more difficult.

Specifically, when an IM session is forked to multiple devices associated with a single AoR, problems arise when the communication endpoints are managed by different vendors. When an IM session for two communication endpoints associated with the AoR is forked in parallel to two different IM systems, the IM session shows up as two separate IM sessions when in reality there is only a single IM session with the AoR.

BRIEF SUMMARY

Systems and methods are provided that can manage IM sessions on different systems. A request to establish an IM session is received. For example, a Session Initiation Protocol (SIP) INVITE message is received. The request is to an Address of Record (AoR) that has two or more associated communication endpoints on different IM systems. The request is forked to the two or more communication endpoints. An IM communication server, acting on behalf of a first communication endpoint, receives one of the forked requests. In response, the IM communication server automatically answers the forked request. For example, the IM communication server can automatically send a SIP 200 OK message. The answer causes the second forked request (which is sent to a second communication endpoint on a different IM system) to be automatically canceled. The IM communication server sends a second request to the second communication endpoint to add the second communication endpoint to the IM session. This allows each communication endpoints to display a single instance of an AoR in the IM session.

DETAILED DESCRIPTION

Figure 1:
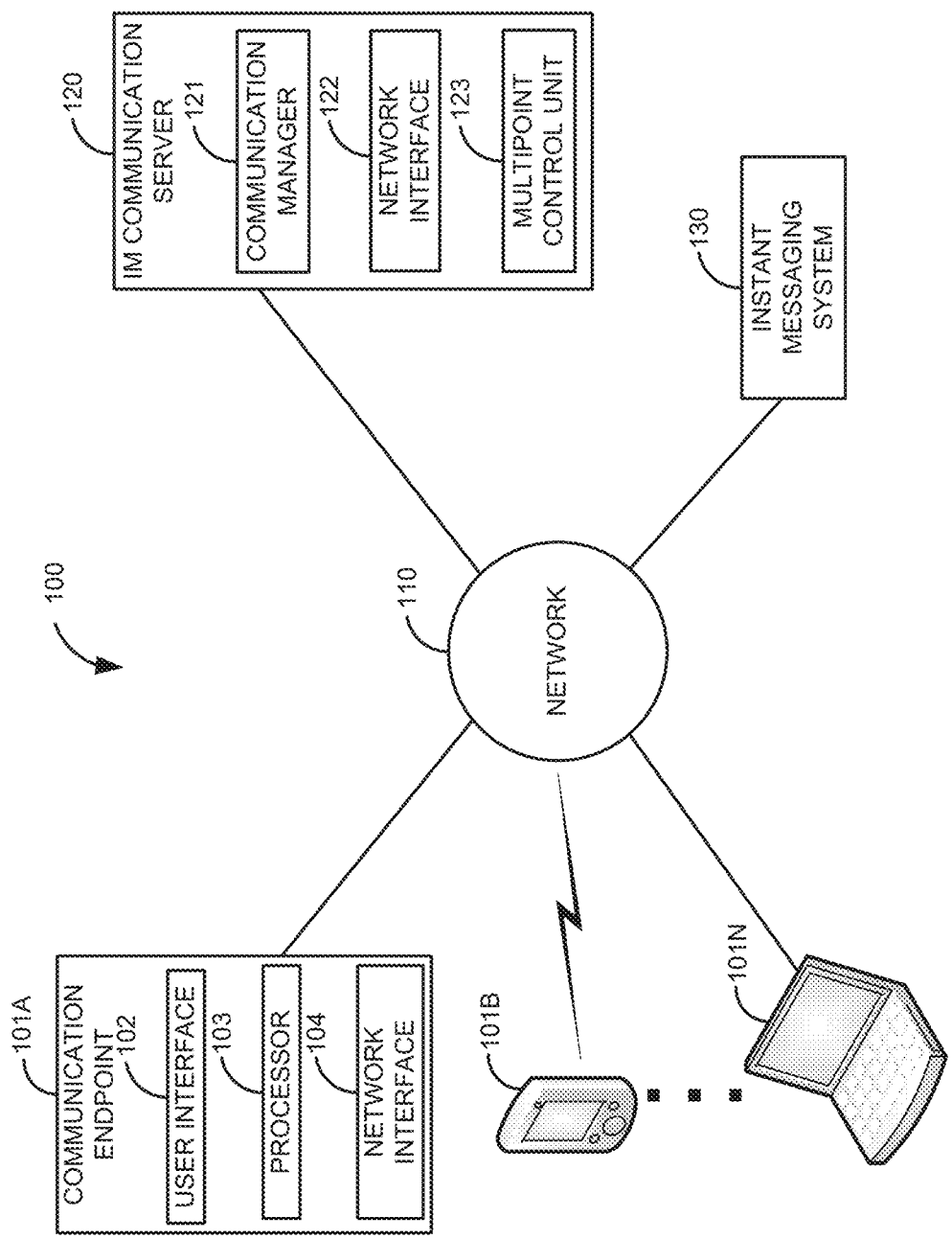
FIG. 1 is a block diagram of a first illustrative system for managing IM sessions.

FIG. 1 is a block diagram of a first illustrative system 100 for managing IM sessions. The first illustrative system 100 comprises communication endpoints 101A-101N, a network 110, an IM communication server 120 and an Instant Messaging (IM) system 130.

The communication endpoint 101 can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication endpoints 101A-101N may be connected to the network 110.

The communication endpoint 101A further comprises a user interface 102, a processor 103, and a network interface 104. The user interface 102 can be any interface that can receive input from a user and/or provide output to a user, such as a mouse, a keyboard, a touch screen, a display, a voice recognition system, a trackball, a LED, a button, a menu, a lamp, and/or the like.

The processor 103 can be any hardware processor that can execute software in the communication endpoint 101A. For example, the processor 103 may be a microprocessor, a microcontroller, a Digital Signaling Processor (DSP), and application specific processor, and/or the like.

The network interface 104 can be any hardware device that can communicate with the network, such as an Ethernet card, a WiFi card, a 3G/4G interface, a wired interface, a fiber optic interface, a modem, a Digital Subscriber Line (DSL) interface, and/or the like.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Web Real-Time Protocol (WebRTC), Hyper Text Transfer Protocol (HTTP), Integrated Services Digital Network (ISDN), and the like. Thus, the network 110 is an electronic communication network configured to carry messages via packets and/or circuit switched communications.

The IM communication server 120 can be any communication device that can manage IM communications, such as, a call processor, a Private Branch Exchange (PBX), a session manager, and/or the like. The IM communication server 120 further comprises a communication manager 121, a network interface 122, and a Multipoint Control Unit (MCU) 123. The communication manager 121 can be any hardware coupled with software that can manage and control IM communications. The network interface 122 can be a network interface similar to the network 104. The MCU 123 can be any hardware coupled with software that can send and receive IMs.

The IM system 130 can be or may include any hardware coupled with software that can manage IM sessions. For example the IM system 130 may be a Microsoft Lync™ system. The IM communication server 120 is a different system than the IM system 130. For example, the IM communication server 120 may be an Avaya Aura™ IM server and the IM system 130 may be a Microsoft Lync™ system.

Figure 2:
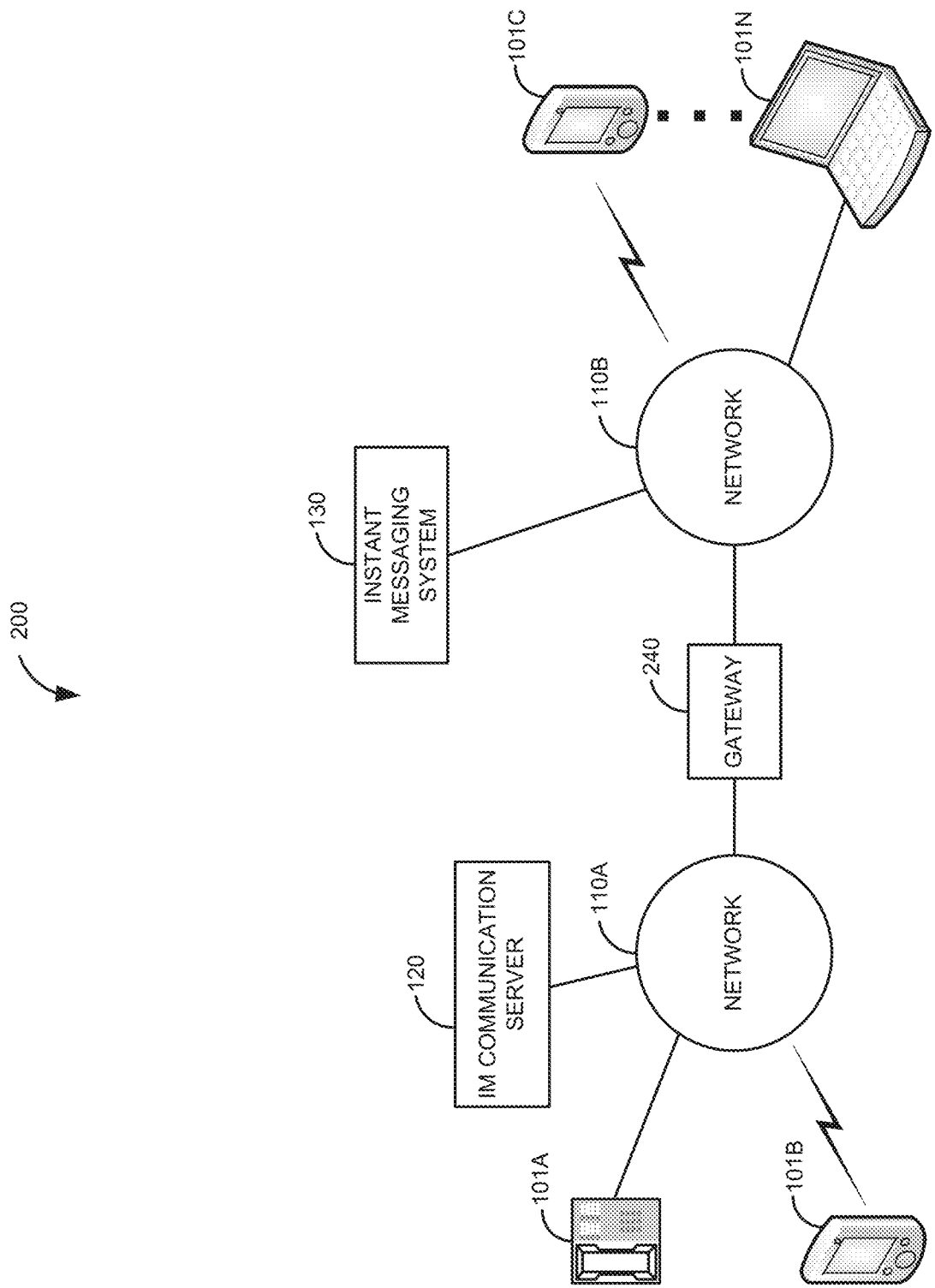
FIG. 2 is a block diagram of a second illustrative system for managing IM sessions on different networks.

FIG. 2 is a block diagram of a second illustrative system 200 for managing IM sessions on different networks 110. The second illustrative system 200 comprises the communication endpoints 101A-101N, networks 110A-110B, the IM communication server 120, the IM system 130, and a gateway 240. The second illustrative system 200 is an exemplary embodiment where there are two different domains for each of the networks 110A-110B. A first domain is controlled by the IM communication server 120 on the network 110A. The second domain is controlled by the IM system 130 on the network 110B. In this configuration, the communication endpoints 101A-101N may be registered in both domains to allow IM communications. Use of domains is not exclusive to FIG. 2, but may be also employed in the embodiment described in FIG. 1.

The gateway 240 can be any device that can provide interaction between the networks 110A and 110B. For example, the gateway 240 may be a Session Border Controller (SBC), a firewall, a Network Address Translator (NAT), a proxy server, and/or the like.

Figure 3:
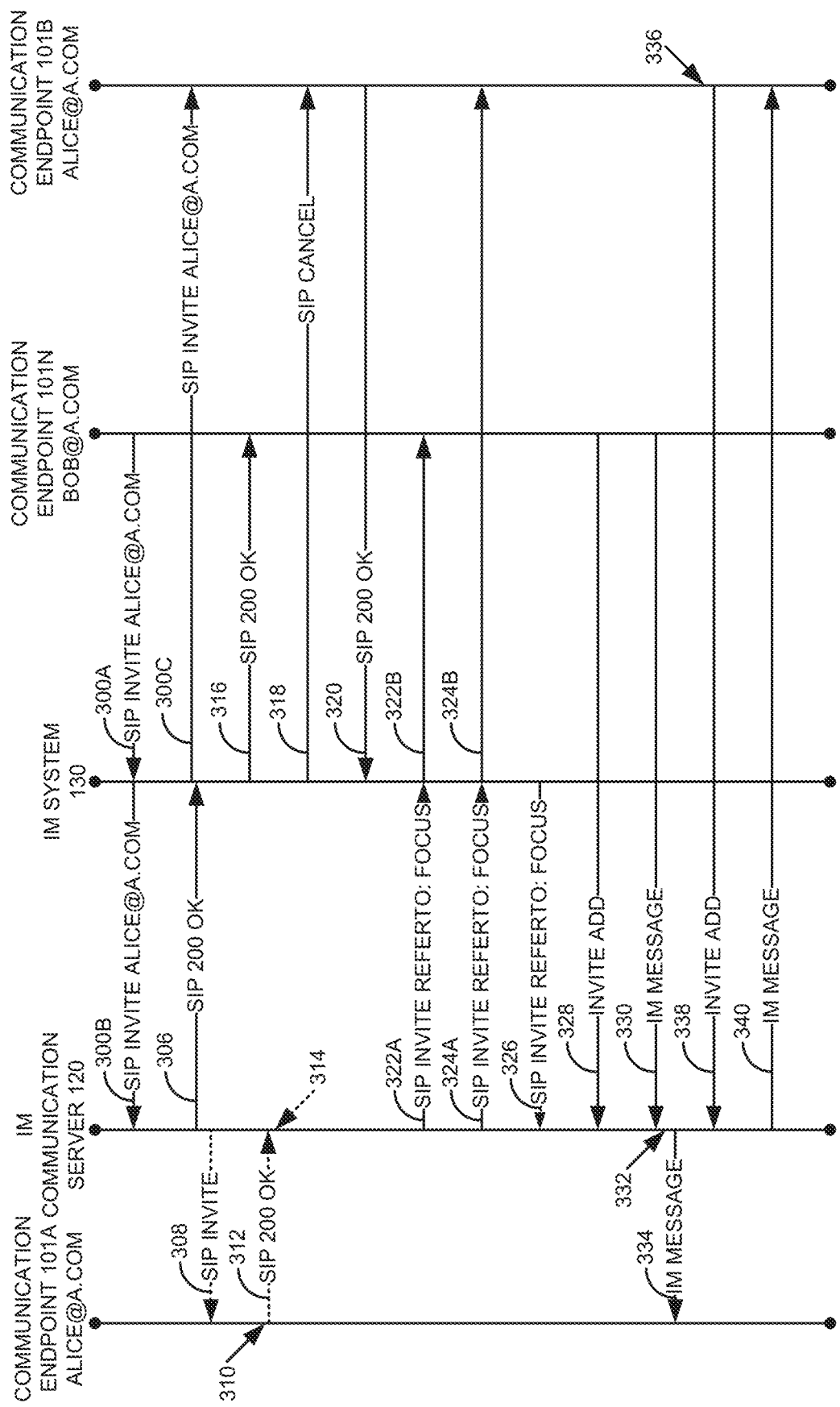
FIG. 3 is a flow diagram of a process for managing IM sessions.

FIG. 3 is a flow diagram of a process for managing IM sessions. Illustratively, the communication endpoints 101A-101N, the IM communication server 120, the communication manager 121, the network interfaces 104/122, the MCU 123, the IM system 130, and the gateway 240 are stored-program-controlled entities, such as a computer or processor, which performs the method of FIG. 3 and the processes described herein by executing program instructions stored in a computer readable storage medium, such as a memory or disk. Although the method described in FIG. 3 is shown in a specific order, one of skill in the art would recognize that the steps in FIG. 3 may be implemented in different orders and/or be implemented in a multi-threaded environment. Moreover, various steps may be omitted or added based on implementation.

The process of FIG. 3 is where there are two communication endpoints 101A and 101B that are associated with a single AoR. For example, the user Alice may have a desktop device (101A) at work and a smart phone (101B) that both use the same AoR. The AoR may be any unique address that identifies a user, such as a telephone number, a Universal Resource Identifier (URI), and/or the like. In this example, the communication endpoint 101A is managed by the IM communication server 120 and the communication endpoint 101B is managed by the IM system 130. The communication endpoint 101N is managed by the IM system 130.

In one embodiment, the communication endpoint 101A is in a first domain and the communication endpoint 101B and 101N are in a second domain. The process of FIG. 3 may work with or with out separate domains. In addition, the process of FIG. 3 may work with either of the embodiments described in FIG. 1 and FIG. 2. The process of FIG. 3 is described using SIP, WebRTC, and HTTP as the primary protocols. However, the process of FIG. 3 is not limited to using these protocols.

In one embodiment, a user of the communication endpoint 101A in the first domain may also be a user in a second domain. For example, the user may be a user in the first domain (e.g., an Avaya Aura™ domain) that is added to an IM session in the second domain (e.g., a Microsoft Lync™ domain) where the user is also registered.

In another embodiment, a user in the first domain may also be a user in the second domain. The user in the second domain is added to a IM conversation in the first domain. For example, a user in a Microsoft Lync™ domain is added to an IM session in an Avaya Aura™ domain where the user is also registered.

The process of FIG. 3 may not show all of the messages that are well know in the protocols used. For example, the uses of SIP ACK messages (responses to the SIP 200 OK messages) are not shown for simplicity. One of skill in the art would recognize that these messages would be used in a SIP implementation.

The process starts in step 300A when the communication endpoint 101N (with an AoR of bob@a.com) sends a SIP INVITE message to establish an IM session with the communication endpoints 101A-101B associated with the AoR of alice@a.com. The SIP INVITE message of step 300A is received at the IM system 130. The IM system 130 determines that the AoR for alice@a.com has two associated communication endpoints 101A-101B. Since there are two communication endpoints 101A-101B associated with the AoR, the IM system 130 forks the SIP INVITE message 300A in parallel to the IM communication server 120 in step 300B and the communication endpoint 101B in step 300C. The IM system 130 sends the forked SIP INVITE message of step 300B to the IM communication server 120 because the IM communication server 120 handles management of IM sessions on behalf for the communication endpoint 101A (which is in a different domain). The IM system 130 also forks the SIP INVITE message to the communication endpoint 101B in step 300C because the communication endpoint 101B is in the same domain as the IM system 130.

In response to receiving the SIP INVITE message of step 300B, the communication manager 121 (in the IM communication server 120) automatically responds by sending a SIP 200 OK message in step 306. This is different than traditional SIP messaging where the SIP 200 OK message is sent when a user answers IM session (e.g., where Alice selects a button to answer the request for the IM session). The SIP 200 OK message of step 306 is received by the IM system 130 and forwarded to the communication endpoint 101N in step 316. In response to receiving the SIP 200 OK message of step 306, the IM system 130 also sends a SIP CANCEL message to the communication endpoint 101B in step 318. The SIP CANCEL message of step 318 drops the request to establish an IM session with the communication endpoint 101B.

At this point, there is a point-to-point IM session between the IM communication server 120 acting on behalf of the communication endpoint 101A and the communication endpoint 101N. The communication manager 121 recognizes that the AoR for alice@a.com has two associated communication endpoints 101A-101B. In order to have three communication endpoints 101A-101N involved in the IM session, the communication manager 121 has to setup an IM conference session.

To establish the IM conference session, the communication manager 121 sends a SIP INVITE referto: focus message to the AoR for bob@a.com in step 322A. The SIP INVITE referto: focus message is to change the point-to-point IM session between AoR bob@a.com and AoR alice@a.com into an IM conference session. The SIP INVITE referto: focus message is forwarded by the IM system 130 to the communication endpoint 101N in step 322B. The communication manager 121 also sends a SIP INVITE referto: focus message to the communication endpoint 101B in step 324A. The SIP INVITE referto: focus message requests the communication endpoint 101B to join an IM conference session with bob@a.com. The IM system 130 forwards the SIP INVITE referto: focus message of step 324A to the communication endpoint 101B in step 324B. The communication endpoint 101B displays an incoming IM session from bob@a.com (even though there are actually two communication endpoints 101A and 101N in the IM conference session). The referto: focus message is a known Session initiation Protocol tag that is defined in Network Working Group, RFC 4579 "Session Initiation Protocol (SIP) Call Control—Conferencing for User Agents," August 2006, which is incorporated herein by refereence in its entirety.

When the IM system 130 receives the SIP INVITE referto: focus message of step 324A, the IM system 130 loops back the SIP INVITE referto: focus message of step 324A to the IM communication server 120 in step 326. The IM system 130 loops back the SIP INVITE referto: focus message of step 324A because there are two communication endpoints 101A-101B associated with the AoR of alice@a.com. The SIP INVITE referto: focus message of step 326 is sent to the IM communication server 120 because the IM communication server 120 is acting on behalf of the communication endpoint 101A. When the IM communication server 120 receives the SIP INVITE referto: focus message of step 326, the communication manager 121 does not respond the SIP INVITE referto: focus message of step 326 because the IM communication server 120 is already aware of the change in focus to an IM conference session.

Since the communication endpoint 101N was previously part of the point-to-point IM session, in response to receiving the SIP INVITE referto: focus message of step 322B, the communication endpoint 101N automatically sends a SIP INVITE add message to the IM communication server 120 in step 328. The SIP INVITE add message of step 328 is to indicate that the user of the communication endpoint 101N has accepted to join the IM conference session.

At this point (after the necessary SIP 200 OK/SIP ACK messages are sent/received (not shown)), an IM conference session is established between the IM communication server 120 (acting on behalf of the communication endpoint 101A) and the communication endpoint 101N. The communication endpoint 101N shows a single IM session with alice@a.com. The user (Bob) sends an IM message in step 330 to alice@a.com. The IM message is received by the MCU 123 in step 330.

The MCU 123 stores the IM message in step 332. The message is stored in step 332 because the communication endpoint 101B has not joined the IM conference session. The MCU 123 sends the IM message to the communication endpoint 101A in step 334.

The user of the communication endpoint 101B accepts the invite to join the communication session in step 336. At this point, the communication endpoint 101B shows a single IM session with bob@a.com. The communication endpoint 101B sends a SIP INVITE add message in step 338 to join the IM conference session. The communication manager 121 receives the SIP INVITE add message from the communication endpoint 101B in step 338. At this point, there is an established IM conference session between the communication endpoints 101A-101N. Each of the communication endpoints 101A-101N only display a single instance (AoR) on their respective displays. The communication endpoint 101A shows an IM session with the AoR bob@a.com. The communication endpoint 101B shows an IM session with bob@a.com. The communication endpoint 101N shows an IM session with alice@a.com.

Once the communication endpoint 101B has been added to the IM conference session, the MCU 123 sends the IM message (that was received in step 330 and stored in step 332) to the communication endpoint 101B in step 340. The IM message that is sent in step 330 and 340 may be sent using Real-Time Protocol (RTP) or Secure RTP.

How the IM message is sent to the communication endpoint 101A in step 334 can vary based on implementation. In one embodiment, the interaction between the communication endpoint 101A and the IM communication server 120 is accomplished using HTTP/WebRTC. In this embodiment, the communication endpoint 101A sends an HTTP get long poll message (not shown). The HTTP GET long poll message is an HTTP get with a long timeout. The IM communication server 120 hangs onto the long poll until it either times out or the IM communication server 120 has a message to send to the communication endpoint 101A. If the HTTP GET long poll message times out, another one is sent. The IM message in step 334 is sent from the IM communication server 120 in response to the HTTP GET with the long poll message. IF the communication endpoint 101A wants to send an IM message, the communication endpoint 101A sends the IM message using an HTTP PUT request (not shown).

In another embodiment SIP is used. In this embodiment, when the SIP INVITE message of step 300B is received, the IM communication server 120 sends a SIP INVITE message to the communication endpoint 101A in step 308. When the user (e.g., Alice) answers the IM session in step 310, the communication endpoint 101A sends a SIP 200 OK message to the IM communication server 120 in step 312. The IM communication server 120, in step 314, does not forward to the 200 OK message of step 312 (as is traditionally done in SIP) because the SIP 200 OK message of step 306 was automatically sent before the user answered the communication session. The IM message of step 334 may be send using RTP or Secure RTP messaging as is well known in SIP. Similarly, IM messages sent by the communication endpoint 101A may be sent using RTP or SRTP.

The above process can also be used where the AoR has more than two associated communication endpoints 101 (e.g., where there are three communication endpoints 101 associated with the AoR). If there are additional communication endpoints 101 associated with the AoR, a similar SIP CANCEL message (like in step 318) would be sent to the third communication endpoint 101. Similarly, a SIP INVITE referto: focus message would be sent to the third communication endpoint 101 (like in step 334). The third communication endpoint 101 would also send a SIP INVITE add message (like in step 338).

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway 240, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element.

The terms "determine", "calculate" and "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

What is claimed is:

1. An Instant Messaging (IM) communication server comprising:
   a microprocessor, wherein the IM communication server is a device in a computer network that is separate from a first, a second, and a third communication endpoint,
   a computer readable medium, coupled with the microprocessor and comprising microprocessor readable and executable instructions that cause the microprocessor to:
   receive a first forked request to establish an IM session to an Address of Record (AoR) associated with the first communication endpoint, wherein the first forked request is also forked, in a second forked request, to the second communication endpoint associated with the AoR and wherein the first forked request is from the third communication endpoint;
automatically answer the first forked request to establish the IM session, wherein automatically answering the first forked request causes the second forked request to be automatically canceled; and
in response to causing the second forked request to be automatically canceled, send a second request to the second communication endpoint to add the second communication endpoint to the IM session,
wherein the IM communication server establishes the IM session between the first, second, and third communication endpoints, and
wherein the second request causes the second communication endpoint to display a single instance for the AoR in the IM session even though there are two communication endpoints for the AoR in the IM session.

2. The IM communication server of claim 1, wherein the first forked request is also forked to another communication endpoint for the AoR in a third forked request, wherein automatically answering the first forked request causes the third forked request to be canceled, and wherein the IM communication server sends a third request to the third communication endpoint to add the third communication endpoint to the IM session.

3. The IM communication server of claim 1, wherein the first forked request is a Session Initiation Protocol (SIP) INVITE message and wherein the second request sent to the second communication endpoint is a first SIP INVITE referto: focus message.

4. The IM communication server of claim 3, wherein the IM communication server receives a second SIP INVITE referto: focus message that is a loopback of the first SIP INVITE referto: focus message and wherein the IM communication server does not respond to the second SIP INVITE referto: focus message.

5. The IM communication server of claim 3, wherein the first forked request is to establish a point-to-point IM session and wherein the first SIP INVITE referto: focus message changes the IM session to an IM conference session.

6. The IM communication server of claim 1, wherein the microprocessor:
receives an IM message from the third communication endpoint and sends a response to a Hyper Text Transfer Protocol (HTTP) long poll message to the first communication endpoint with the IM message in response to receiving the IM message from the third communication endpoint.

7. The IM communication server of claim 1, wherein the first forked request is a SIP INVITE message, wherein automatically answering the first forked request comprises sending a first SIP 200 OK message to the third communication endpoint, and wherein the IM communication server sends the first forked request to the first communication endpoint associated with the AoR; and after automatically answering the first forked request to establish the IM session, receives a second SIP 200 OK message, wherein the second SIP 200 OK message is sent in response to a user answering the first forked request.

8. The IM communication server of claim 7, wherein the second SIP 200 OK message is not forwarded to the third communication endpoint because the first SIP 200 OK was automatically sent before user answered the first forked request.

9. A method comprising:
receiving, by a processor in an Instant Messaging (IM) communication server that is a device in a computer network that is separate from a first, a second, and a third communication endpoint, a first forked request to establish an Instant Messaging (IM) session to an Address of Record (AoR) associated with the first communication endpoint, wherein the first forked request is also forked, in a second forked request, to a second communication endpoint associated with the AoR, and wherein the first forked request is from the third communication endpoint;
automatically answering, by the processor, the first forked request to establish the IM session, wherein automatically answering the first forked request causes the second forked request to be canceled automatically;
sending, by the processor, a second request to the second communication endpoint to add the second communication endpoint to the IM session in response to causing the second forked request to be canceled automatically; and
establishing the IM session between the first, second, and third communication endpoints,
wherein the second request causes the second communication endpoint to display a single instance for the AoR in the IM session even though there are two communication endpoints for the AoR in the IM session.

10. The method of claim 9, wherein the first forked request is also forked to another communication endpoint for the AoR in a third forked request, wherein automatically answering the first forked request causes the third forked request to be canceled, and further comprising: sending, by the processor, a third request to the third communication endpoint to add the third communication endpoint to the IM session.

11. The method of claim 9, wherein the first forked request is a Session Initiation Protocol (SIP) INVITE message and wherein the second request sent to the second communication endpoint is a first SIP INVITE referto: focus message.

12. The method of claim 11, further comprising:
receiving, by the processor, a second SIP INVITE referto: focus message that is a loopback of the first SIP INVITE referto: focus message; and
not responding to the second SIP INVITE referto: focus message.

13. The method of claim 11, wherein the first forked request is to establish a point-to-point IM session and wherein the first SIP INVITE referto: focus message changes the IM session to an IM conference session.

14. The method of claim 9, further comprising:
receiving, by the processor, an IM message from the third communication endpoint; and
in response to receiving the IM message from the third communication endpoint, sending, by the processor, a response to a Hyper Text Transfer Protocol (HTTP) long poll message to the first communication endpoint with the IM message.

15. The method of claim 9, wherein the first forked request is a SIP INVITE message, wherein automatically answering the first forked request comprises sending a first SIP 200 OK message to the third communication endpoint, and further comprising:
sending, by the processor, the first forked request to the first communication endpoint associated with the AoR; and after automatically answering the first forked request to establish the IM session, receiving, by the processor, a second SIP 200 OK message, wherein the second SIP 200 OK message is sent in response to a user answering the first forked request.

16. The method of claim 9, further comprising:

storing one or more IM messages;

receiving an INVITE add message from the second communication endpoint; and in response to receiving the INVITE add message from the second communication endpoint, sending the one or more stored IM messages to the second communication endpoint.

17. A method comprising:

receiving, by a processor in an Instant Messaging (IM) communication server that is a device operating in a first Instant Messaging (IM) system that is separate from a first, a second, and a third communication endpoint, a first forked request from a second IM system different than the first IM system to establish an Instant Messaging (IM) session to an Address of Record (AoR) associated with the first communication endpoint, wherein the first forked request is also forked, in a second forked request, to a second communication endpoint associated with the AoR, and wherein the first forked request is from the third communication endpoint;

automatically answering, by the processor, the first forked request to establish the IM session, wherein automatically answering the first forked request causes the second forked request to be canceled automatically;

sending, by the processor, a second request to the second communication endpoint to add the second communication endpoint to the IM session in response to causing the second forked request to be canceled automatically; and establishing the IM session between the first, second, and third communication endpoints, wherein the second request causes the second communication endpoint to display a single instance for the AoR in the IM session even though there are two communication endpoints for the AoR in the IM session.

18. The method of claim 17, wherein the first forked request is also forked to another communication endpoint for the AoR in a third forked request, wherein automatically answering the first forked request causes the third forked request to be canceled, and further comprising: sending, by the processor, a third request to the third communication endpoint to add the third communication endpoint to the IM session.

19. The method of claim 17, further comprising:

receiving, by the processor, an IM message from the third communication endpoint; and in response to receiving the IM message from the third communication endpoint, sending, by the processor, a response to a Hyper Text Transfer Protocol (HTTP) long poll message to the first communication endpoint with the IM message.

20. The method of claim 17, wherein the first forked request is a SIP INVITE message, wherein automatically answering the first forked request comprises sending a first SIP 200 OK message to the third communication endpoint, and further comprising:

sending, by the processor, the first forked request to the first communication endpoint associated with the AoR; and after automatically answering the first forked request to establish the IM session, receiving, by the processor, a second SIP 200 OK message, wherein the second SIP 200 OK message is sent in response to a user answering the first forked request.

\* \* \* \* \*